US006694043B2

(12) United States Patent
Seder et al.

(10) Patent No.: US 6,694,043 B2
(45) Date of Patent: *Feb. 17, 2004

(54) METHOD OF MONITORING PRINT DATA FOR TEXT ASSOCIATED WITH A HYPERLINK

(75) Inventors: Phillip Andrew Seder, Portland, OR (US); J. Scott Carr, Tualatin, OR (US); Burt W. Perry, Lake Oswego, OR (US); Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/118,847

(22) Filed: Apr. 8, 2002

(65) Prior Publication Data

US 2002/0181737 A1 Dec. 5, 2002

Related U.S. Application Data

(60) Division of application No. 09/629,401, filed on Aug. 1, 2000, now Pat. No. 6,522,770, which is a continuation-in-part of application No. 09/343,104, filed on Jun. 29, 1999, and a continuation-in-part of application No. 09/571,422, filed on May 15, 2000.

(51) Int. Cl.[7] .................................................. G06K 9/00
(52) U.S. Cl. ........................ 382/100; 358/3.28; 382/306
(58) Field of Search ................................... 382/100, 112, 382/232, 137, 138–140, 305, 306; 235/435, 436; 283/67–70, 72; 358/3.28; 380/201, 54; 709/200; 713/176

(56) References Cited

U.S. PATENT DOCUMENTS

| 3,414,998 A | * | 12/1968 | Berger ........................ 283/113 |
| 3,845,391 A | | 10/1974 | Crosby |
| 3,984,624 A | | 10/1976 | Waggener |
| 4,238,849 A | | 12/1980 | Gassmann |
| 4,313,197 A | | 1/1982 | Maxemchuk |

(List continued on next page.)

FOREIGN PATENT DOCUMENTS

| DE | 2943436 | 5/1981 |
| EP | 493 091 | 7/1992 |
| EP | 1117246 | 7/2001 |
| EP | 1139244 | 10/2001 |
| EP | 1143723 | 10/2001 |

(List continued on next page.)

OTHER PUBLICATIONS

U.S. patent application Ser. No. 09/074,034, Rhoads, filed May 5, 1998.

(List continued on next page.)

*Primary Examiner*—Jayanti K. Patel
(74) *Attorney, Agent, or Firm*—Steven W. Stewart; Digimarc Corporation (57) ABSTRACT

By printing documents and other objects with machine readable indicia, such as steganographic digital watermarks or barcodes, a great variety of document management functions can be enabled. The indicia can be added as part of the printing process (after document data has been output by an originating application program), such as by printer driver software, by a Postscript engine in a printer, etc. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

29 Claims, 3 Drawing Sheets

U.S. PATENT DOCUMENTS

| | | | |
|---|---|---|---|
| 4,367,488 A | 1/1983 | Leventer et al. | |
| 4,379,947 A | 4/1983 | Warner | |
| 4,380,027 A | 4/1983 | Leventer et al. | |
| 4,395,600 A | 7/1983 | Lundy et al. | |
| 4,425,642 A | 1/1984 | Moses et al. | |
| 4,528,588 A | 7/1985 | Löfberg | |
| 4,547,804 A | 10/1985 | Greenberg | |
| 4,672,605 A | 6/1987 | Hustig et al. | |
| 4,675,746 A | 6/1987 | Tetrick et al. | |
| 4,750,173 A | 6/1988 | Blüthgen | |
| 4,807,031 A | 2/1989 | Broughton et al. | |
| 4,855,827 A | 8/1989 | Best | |
| 4,888,798 A | 12/1989 | Earnest | |
| 4,908,836 A | 3/1990 | Rushforth et al. | |
| 4,947,028 A | 8/1990 | Gorog | |
| 4,969,041 A | 11/1990 | O'Grady et al. | |
| 4,977,594 A | 12/1990 | Shear | |
| 5,023,907 A | 6/1991 | Johnson et al. | |
| 5,053,956 A | 10/1991 | Donald et al. | |
| 5,103,459 A | 4/1992 | Gilhousen et al. | |
| 5,113,518 A | 5/1992 | Durst, Jr. et al. | |
| 5,138,712 A | 8/1992 | Corbin | |
| 5,146,457 A | 9/1992 | Veldhuis et al. | |
| 5,243,423 A | 9/1993 | DeJean et al. | |
| 5,262,860 A | 11/1993 | Fitzpatrick et al. | |
| 5,288,976 A | 2/1994 | Citron et al. | |
| 5,319,735 A | 6/1994 | Preuss et al. | |
| 5,385,371 A | 1/1995 | Izawa | |
| 5,428,731 A | 6/1995 | Powers, III | |
| 5,444,779 A | 8/1995 | Daniele | |
| 5,463,209 A | 10/1995 | Figh et al. | |
| 5,493,677 A | 2/1996 | Balogh et al. | |
| 5,495,411 A | 2/1996 | Ananda | |
| 5,495,581 A | 2/1996 | Tsai | |
| 5,496,071 A | 3/1996 | Walsh | |
| 5,502,576 A * | 3/1996 | Ramsay et al. | 358/444 |
| 5,502,727 A * | 3/1996 | Catanzaro et al. | 370/271 |
| 5,509,074 A | 4/1996 | Choudhury et al. | |
| 5,517,663 A * | 5/1996 | Kahn | 345/473 |
| 5,521,722 A * | 5/1996 | Colvill et al. | 358/500 |
| 5,524,933 A | 6/1996 | Kunt et al. | |
| 5,530,759 A * | 6/1996 | Braudaway et al. | 380/54 |
| 5,530,852 A | 6/1996 | Meske | |
| 5,548,645 A | 8/1996 | Ananda | |
| 5,553,143 A | 9/1996 | Ross | |
| 5,579,479 A | 11/1996 | Plum | |
| 5,613,004 A | 3/1997 | Cooperman | |
| 5,629,770 A | 5/1997 | Brassil et al. | |
| 5,629,980 A | 5/1997 | Stefik | |
| 5,634,012 A | 5/1997 | Stefik | |
| 5,636,276 A | 6/1997 | Brugger | |
| 5,638,443 A | 6/1997 | Stefik | |
| 5,640,193 A | 6/1997 | Wellner | |
| 5,640,467 A | 6/1997 | Yamashita et al. | |
| 5,646,997 A | 7/1997 | Barton | |
| 5,646,999 A | 7/1997 | Saito | |
| 5,652,626 A | 7/1997 | Kawakami et al. | |
| 5,652,714 A | 7/1997 | Peterson | |
| 5,657,462 A | 8/1997 | Brouwer | |
| 5,659,164 A | 8/1997 | Schmid | |
| 5,663,766 A | 9/1997 | Sijzer, II | |
| 5,665,951 A | 9/1997 | Newman et al. | |
| 5,671,277 A | 9/1997 | Ikenoue et al. | |
| 5,671,282 A | 9/1997 | Wolff et al. | |
| 5,673,316 A | 9/1997 | Auerbach et al. | |
| 5,680,223 A | 10/1997 | Cooper et al. | |
| 5,692,073 A | 11/1997 | Cass | |
| 5,713,032 A | 1/1998 | Spencer | |
| 5,715,403 A | 2/1998 | Stefik | |
| 5,717,940 A | 2/1998 | Peairs et al. | |
| 5,719,948 A * | 2/1998 | Liang | 382/112 |
| 5,721,788 A | 2/1998 | Powell | |
| 5,729,741 A * | 3/1998 | Liaguno et al. | 707/104.1 |
| 5,734,119 A | 3/1998 | France | |
| 5,742,845 A | 4/1998 | Wagner | |
| 5,748,763 A | 5/1998 | Rhoads | |
| 5,761,606 A | 6/1998 | Wolzien | |
| 5,761,686 A | 6/1998 | Bloomberg | |
| 5,765,152 A | 6/1998 | Erickson | |
| 5,765,176 A | 6/1998 | Bloomberg | |
| 5,772,250 A | 6/1998 | Gasper | |
| 5,774,452 A | 6/1998 | Wolosewicz | |
| 5,778,102 A | 7/1998 | Sandford, II et al. | |
| 5,801,687 A | 9/1998 | Peterson et al. | |
| 5,804,803 A | 9/1998 | Cragun et al. | |
| 5,809,317 A | 9/1998 | Kogan | |
| 5,818,441 A | 10/1998 | Throckmorton | |
| 5,822,432 A | 10/1998 | Moskowitz et al. | |
| 5,822,436 A | 10/1998 | Rhoads | |
| 5,828,325 A | 10/1998 | Wolosewicz et al. | |
| 5,838,458 A | 11/1998 | Tsai | |
| 5,841,978 A | 11/1998 | Rhoads | |
| 5,845,281 A | 12/1998 | Benson et al. | |
| 5,848,413 A | 12/1998 | Wolff | |
| 5,848,424 A | 12/1998 | Scheinkman et al. | |
| 5,852,673 A | 12/1998 | Young | |
| 5,857,038 A | 1/1999 | Owada et al. | |
| 5,872,589 A | 2/1999 | Morales | |
| 5,892,900 A | 4/1999 | Ginter et al. | |
| 5,893,908 A | 4/1999 | Cullen et al. | |
| 5,893,910 A | 4/1999 | Martineau | |
| 5,900,608 A | 5/1999 | Iida | |
| 5,902,353 A | 5/1999 | Reber et al. | |
| 5,903,729 A | 5/1999 | Reber et al. | |
| 5,905,248 A | 5/1999 | Russell et al. | |
| 5,910,987 A | 6/1999 | Ginter et al. | |
| 5,913,210 A | 6/1999 | Call | |
| 5,915,027 A | 6/1999 | Cox et al. | |
| 5,918,214 A | 6/1999 | Perkowski | |
| 5,919,730 A | 7/1999 | Gasper et al. | |
| 5,920,861 A | 7/1999 | Hall et al. | |
| 5,920,878 A | 7/1999 | DeMont | |
| 5,926,822 A | 7/1999 | Garman | |
| 5,930,767 A | 7/1999 | Reber et al. | |
| 5,932,863 A | 8/1999 | Rathus et al. | |
| 5,933,829 A | 8/1999 | Durst et al. | |
| 5,938,726 A | 8/1999 | Reber et al. | |
| 5,940,595 A | 8/1999 | Reber et al. | |
| 5,943,422 A | 8/1999 | Van Wie et al. | |
| 5,949,885 A | 9/1999 | Leighton | |
| 5,971,277 A | 10/1999 | Cragun et al. | |
| 5,974,141 A | 10/1999 | Saito | |
| 5,974,548 A | 10/1999 | Adams | |
| 5,978,477 A | 11/1999 | Hull et al. | |
| 5,978,773 A | 11/1999 | Hudetz et al. | |
| 5,983,218 A | 11/1999 | Syeda-Mahmood | |
| 5,986,651 A | 11/1999 | Reber et al. | |
| 5,991,876 A | 11/1999 | Johnson et al. | |
| 5,995,105 A | 11/1999 | Reber et al. | |
| 5,995,978 A | 11/1999 | Cullen et al. | |
| 6,006,226 A | 12/1999 | Cullen et al. | |
| 6,012,102 A | 1/2000 | Shachar | |
| 6,052,486 A | 4/2000 | Knowlton et al. | |
| 6,061,686 A | 5/2000 | Gauvin et al. | |
| 6,081,827 A | 6/2000 | Reber et al. | |
| 6,084,528 A | 7/2000 | Beach et al. | |
| 6,085,205 A | 7/2000 | Peairs et al. | |
| 6,098,106 A | 8/2000 | Philyaw et al. | |
| 6,112,181 A | 8/2000 | Shear et al. | |
| 6,122,403 A | 9/2000 | Rhoads | |
| 6,138,151 A | 10/2000 | Reber et al. | |

| | | |
|---|---|---|
| 6,148,331 A | 11/2000 | Parry |
| 6,164,534 A | 12/2000 | Rathus et al. |
| 6,182,090 B1 | 1/2001 | Peairs |
| 6,185,683 B1 | 2/2001 | Ginter et al. |
| 6,199,048 B1 | 3/2001 | Hudetz et al. |
| 6,199,073 B1 | 3/2001 | Peairs et al. |
| 6,209,092 B1 | 3/2001 | Linnartz |
| 6,237,786 B1 | 5/2001 | Ginter et al. |
| 6,286,036 B1 | 9/2001 | Rhoads |
| 6,292,569 B1 | 9/2001 | Shear et al. |
| 6,311,214 B1 | 10/2001 | Rhoads |
| 6,314,457 B1 | 11/2001 | Schena et al. |
| 6,324,573 B1 | 11/2001 | Rhoads |
| 6,325,420 B1 | 12/2001 | Zhang et al. |
| 6,332,149 B1 | 12/2001 | Warmus et al. |
| 6,334,721 B1 | 1/2002 | Horigane |
| 6,343,204 B1 | 1/2002 | Yang |
| 6,351,815 B1 | 2/2002 | Adams |
| 6,354,630 B1 | 3/2002 | Zhang et al. |
| 6,384,744 B1 | 5/2002 | Philyaw et al. |
| 6,389,151 B1 | 5/2002 | Carr et al. |
| 6,396,594 B1 | 5/2002 | French et al. |
| 6,427,140 B1 | 7/2002 | Ginter et al. |
| 6,434,561 B1 | 8/2002 | Durst, Jr. et al. |
| 6,526,449 B1 | 2/2003 | Philyaw et al. |
| 6,538,763 B1 | 3/2003 | Klosterman et al. |
| 6,542,933 B1 | 4/2003 | Durst et al. |
| 2001/0001854 A1 | 5/2001 | Schena et al. |
| 2001/0003176 A1 | 6/2001 | Schena et al. |
| 2001/0006551 A1 | 7/2001 | Masaki |
| 2001/0006585 A1 | 7/2001 | Horigane |
| 2001/0007130 A1 | 7/2001 | Takaragi |
| 2001/0016852 A1 | 8/2001 | Peairs et al. |
| 2001/0017704 A1 | 8/2001 | Akiyama |
| 2001/0017709 A1 | 8/2001 | Murakami et al. |
| 2001/0023421 A1 | 9/2001 | Numao et al. |
| 2001/0026377 A1 | 10/2001 | Ikegami |
| 2001/0032251 A1 | 10/2001 | Rhoads et al. |
| 2001/0043362 A1 | 11/2001 | Hull et al. |
| 2001/0053299 A1 | 12/2001 | Matsunoshita et al. |
| 2001/0055391 A1 | 12/2001 | Jacobs |
| 2001/0056468 A1 | 12/2001 | Okayasu et al. |
| 2002/0012444 A1 | 1/2002 | Nishikawa et al. |
| 2002/0015042 A1 | 2/2002 | Robotham et al. |
| 2002/0018223 A1 | 2/2002 | Kashihara |
| 2002/0023148 A1 | 2/2002 | Ritz et al. |
| 2002/0048369 A1 | 4/2002 | Ginter et al. |
| 2002/0049614 A1 | 4/2002 | Rice et al. |
| 2002/0051545 A1 | 5/2002 | Ogilvie |
| 2002/0075298 A1 | 6/2002 | Schena et al. |
| 2002/0080271 A1 | 6/2002 | Eveleens et al. |
| 2002/0080396 A1 | 6/2002 | Silverbrook et al. |
| 2002/0085759 A1 | 7/2002 | Davis et al. |
| 2002/0102966 A1 | 8/2002 | Lev et al. |

FOREIGN PATENT DOCUMENTS

| | | |
|---|---|---|
| EP | 1156662 | 11/2001 |
| EP | 1209897 | 5/2002 |
| JP | 8-50598 | 2/1996 |
| WO | WO94/27228 | 11/1994 |
| WO | WO95/14289 | 5/1995 |
| WO | WO95/20291 | 7/1995 |
| WO | WO96/27259 | 9/1996 |
| WO | WO96/36163 | 11/1996 |
| WO | WO97/02522 | 1/1997 |
| WO | WO97/43736 | 11/1997 |
| WO | WO98/03923 | 1/1998 |
| WO | WO98/20642 | 5/1998 |
| WO | WO98/24050 | 6/1998 |
| WO | WO98/51036 | 11/1998 |
| WO | WO99/34277 | 7/1999 |
| WO | WO99/57623 | 11/1999 |
| WO | WO01/74053 | 10/2001 |
| WO | WO02/03328 | 1/2002 |
| WO | WO02/25599 | 3/2002 |
| WO | WO02/27618 | 4/2002 |

OTHER PUBLICATIONS

U.S. patent application Ser. No. 09/127,502, Rhoads, filed Jul. 31, 1998.

U.S. patent application Ser. No. 09/185,380, Davis et al., filed Nov. 3, 1998.

U.S. patent application Ser. No. 09/314,648, Rodriguez et al., filed May 19, 1999.

U.S. patent application Ser. No. 09/342,688, Rodriguez et al., filed Jun. 29, 1999.

U.S. patent application Ser. No. 09/343,104, Rodriguez et al., Jun. 29, 1999.

U.S. patent application Ser. No. 09/452,021, Davis et al., filed Nov. 30, 1999.

U.S. patent application Ser. No. 09/503,881, Rhoads et al., filed May 14, 2000.

U.S. patent application Ser. No. 09/515,826, Rodriguez, filed Feb. 29, 2000.

U.S. patent application Ser. No. 09/571,422, Rhoads et al., filed May 15, 2000.

U.S. patent application Ser. No. 09/790,322, Lofgren et al., filed Feb. 21, 2001.

U.S. patent application Ser. No. 60/000,442, Hudetz, Jun. 20, 1995.

Bartlett, et al., "An Overview of High Water FBI Technology," Posted on Internet Mar. 22, 1996, 12 pages.

Bethoney, "A Lasting Way For Artists To Leave Their Mark," PCWeek, Dec. 11, 1996.

Bloomberg, "Embedding Digital Data on Paper in Iconic Text" SPIE vol. 3027, Document Recognition IV, pp. 67–81 (1997).

Brassil et al., "Electronic Marking and Identification Techniques to Discourage Document Copying," Proceedings of INFOCOM '94 Conference on Computer, IEEE Commun. Soc Conference, Jun. 12–16, 1994, pp. 1278–1287.

Bruckstein, A.M.: Richardson, T.J., "A holographic transform domain image watermarking method," Circuits, Systems, and Signal Processing vol. 17, No. 3 p. 361–89, 1998. This paper includes an appendix containing an internal memo of Bell Labs, which according to the authors of the paper, was dated Sep. 1994.

"Copyright Protection for Digital Images, Digital Fingerprinting from FBI," Highwater FBI brochure, 1995, 4 pages.

Dautzenberg, "Watermarking Images," Department of Microelectronics and Electrical Engineering, Trinity College Dublin, 47 pages, Oct. 1994.

Digimarc presentation at RSA Conference, 1/96, 4 pages.

Digital Media Monthly, Aug., 1996 (except re Highwater FBI). Digimarc Press Release (various), 1996–1998.

"Digital Watermarks What Are They?" Digimarc Corporation, 1997. Seybold Report on Internet Publishing, vol. 1, No. 4, Dec. 1996.

"Distributing Uniform Resource Locators as Bar Code Images," IBM Technical Disclosure Bulletin, No. 39, No. 1, pp. 167–168, 96A 60059, published Jan. 1, 1996.

Frequently Asked Questions about Digimarc Signature Technology, Aug. 1, 1995, 9 pages.

IBM Technical Disclosure Bulletin 96A 61092, "Graphic Coded Icon," published Jan. 1, 1996.

"High Water FBI Limited Presentation Image Copyright Protection Software," FBI Ltd brochure, Jul., 1995, 17 pages.

Johnson, et al., "Bridging the Paper and Electronic Worlds: The Paper User Interface", Interchi '93, pp. 507–512, Apr. 1993.

Koch et al., "Copyright Protection for Multimedia Data," Proc. of the International Conference on Digital Media and Electronic Publishing, Dec. 6–8, 1994, Leeds, U.K., 15 pages.

Kurak et al., "A Cautionary Note On Image Downgrading," 1992 IEEE, pp. 153–159.

Mintzer et al., "Safeguarding Digital libray Contents and Users," Digital Watermarking, D–Lib Magazine, Dec. 1997: ISSN 1082–9873.

Newman, William, et al. "A Desk Supporting Computer–Based Interaction with paper Documents," ACM Conference on Human Factors in Computing Systems (CHI '92) May 3–7, 1992, pp. 587–592.

Peairs, "Iconic Paper," Proceedings of the Third International Conference on Document Analysis and Recognition (ICDAR '95), pp. 1174–1179, 1995.

Rao, et al. "Protofoil: Storing and Finding the Information Worker's Paper Documents in an Electronic File Cabinet," Human Factors in Computing Systems (CHI '94), pp. 180–186, Boston, MA, Apr. 1994.

Seybold Report on Publishing Systems, vol. 25, No. 6, 1996.

Seybold Bulletin on Computer Publishing, Oct. 18, 1995 (except re Highwater FBI).

Simone, "A Digital Watermark for Images," PC Magazine Dec. 18, 1996.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Tirkel et al, "Electronic Water Mark," DICTA–93, Macquarie University, Sydney, Australia, Dec., 1993, pp. 666–673.

Whittaker, et al., "Back to the Future: Pen and Paper Technology Supports Complex Group Coordination," CHI '95, Conference on Human Factors in Computing Systems, Denver, Colorado (May 7–11, 1995) (text copy obtained from ACM).

Zhao, et al., "A WWW Service to Embed and Prove Digital Copyright Watermarks," Fraunhofer Institute for Computer Graphics, Proc. of EU Conf. On Multimedia Applications, Services and Techniques, May 1996.

Zhao et al., "Embedding Robust Labels Into Images for Copyright Protection," Prof. of the International Congress on Intellectual Property Rights for Specialized Information, Knowledge and New Technologies (Vienna, Austria) Aug. 21–25, 1995, 10 pages.

* cited by examiner

FIG. 1

Customer Support

Find all the information you need to start using Digimarc MediaBridge.

Frequently asked questions about Digimarc MediaBridge:
how it works, what it can do, and how to get the most out of it.

If you have questions or comments about Digimarc MediaBridge, we're here to help. Please direct your emails to Customer Care Group or call 1-877-477-9992 and ask for Digimarc MediaBridge Customer Service.

We recommend the following Intel cameras:

Intel PC Camera Pro Pack
    Intel PC Camera Pack These cameras are approved for Digimarc MediaBridge use:

Intel PC Camera Pro Pack
    Intel PC Camera Pack
    Philips Vesta Pro (PCVC680K)
    Philips Vesta (PCVC675K)
    3Com HomeConnect - (Mac users, Click here for camera drivers)

See which cameras work with your operating system.

Fig. 2

| IDENTIFIER | TEXT EXCERPT | ASSOCIATED HYPERLINK |
|---|---|---|
| 186282A | Frequently asked questions about Digimarc MediaBridge: | http://www.digimarc.com/mediabridge/mbco_csfaq.shtml |
| 186282B | Customer Care Group | mailto:helpdesk@digimarc.com |
| 186282C | Intel PC Camera Pro Pack | http://www.intel.com/pccamera/index.htm?iid=prodinfo+video03& |
| 186282D | Intel PC Camera Pack | http://www.intel.com/pccamera/pack.htm?iid=prodinfo+video03& |
| 186282E | Click here | http://www.3com.com/client/pcd/homeconnect/pcdigital/drivers.html#b |
| 186282F | See | http://www.digimarc.com/mediabridge/mbco_cmatrix.shtml |

Fig. 3

METHOD OF MONITORING PRINT DATA FOR TEXT ASSOCIATED WITH A HYPERLINK

RELATED APPLICATION DATA

The present application is a divisional of U.S. patent application Ser. No. 09/629,401, filed Aug. 1, 2000 now U.S. Pat. No. 6,522,770 (Allowed). The Ser. No. 09/629,401 application is a continuation-in-part of copending application Ser. No. 09/343,104, filed Jun. 29, 1999, and Ser. No. 09/571,422, filed May 15, 2000.

FIELD OF THE INVENTION

The present invention relates to management of physical objects, including paper documents and computer disks.

BACKGROUND AND SUMMARY OF THE INVENTION

The parent applications disclose a document management system that is described, in part, by the following example:

An Excel spreadsheet is printed onto paper, and the paper becomes buried in a stack of clutter on an office worker's desk. Months later the spreadsheet again becomes relevant and is dug out of the stack. Changes need to be made to the data, but the file name has long-since been forgotten. A worker simply holds the dug-out page in front of a camera associated with a desktop computer. A moment later, the electronic version of the file appears on the worker's computer display.

When the page was originally printed, tiny droplets of ink or toner were distributed across the paper in a pattern so light as to be essentially un-noticeable, but which steganographically encoded the page with a plural-bit binary number (e.g., 64 bits). A database (e.g., maintained by the operating system, the Excel program, the printer driver, etc.) stored part of this number (e.g., 24 bits, termed a UID) in association with the path and file name at which the electronic version of the file was stored, the page number within the document, and other useful information (e.g., author of the file, creation date, etc.).

The steganographic encoding of the document, and the updating of the database, can be performed by the software application (e.g. Excel). This option can be selected once by the user and applied thereafter to all printed documents (e.g., by a user selection on an "Options" drop-down menu), or can be presented to the user as part of the Print dialog window and selected (or not) for each print job.

When such a printed page is later presented to the camera, the computer automatically detects the presence of the encoded data on the page, decodes same, consults the database to identify the file name/location/page corresponding to the 24-bit UID data, and opens the identified file to the correct page (e.g., after launching Excel). Voila!

Sometimes there may be several different responses that are possible or appropriate for the encoded object. In the case of a printed office document, for example, one response may be as described above—to present the electronic version of the file on a computer, ready for editing. But other responses may also be desired, such as writing an email message to the author of the printed document, with the author's email address already specified in the message address field, etc. Various ways of selecting between such options are disclosed.

The parent applications note that such systems can be effected not just with steganographic encoding (e.g., digital watermarks), but other encoding as well—e.g., bar codes.

In the discussion that follows, the present specification expands and enhances the concepts introduced in the parent applications.

DETAILED DESCRIPTION

In accordance with one embodiment of the invention, a steganographic watermark is added to a document at the time of printing. The printing may be done by a standard office printer (e.g., ink-jet, laser, etc.), or a large clustered on-demand document printer. Each document copy thus contains a mark that can be used to uniquely identify the document. Such marks can be registered in a database and used to link to information about the document.

This functionality can be achieved in various ways. For example, the application program that generated the document (e.g., Microsoft Word or Excel, Adobe Photoshop, etc.) can add the necessary markings to the output data provided to a printer driver. Or the printer driver can perform the function—adding the necessary markings to the output data provided from the application program. A microprocessor within the printer can alternatively perform the function—adding the necessary markings to the data output by the printer driver software. Or this functionality can be performed by various combinations of the foregoing. Etc.

An election to add a watermark to the printed output can be made by the user. This election can be made once, e.g., at the time of printer driver installation, and consistently applied thereafter. Or it can be made on a print-job by print-job or page by page basis, e.g., through a print dialog presented by the application program when the user requests printed output. Or the watermark can be added all the time—without any user election or involvement.

Figure 1:
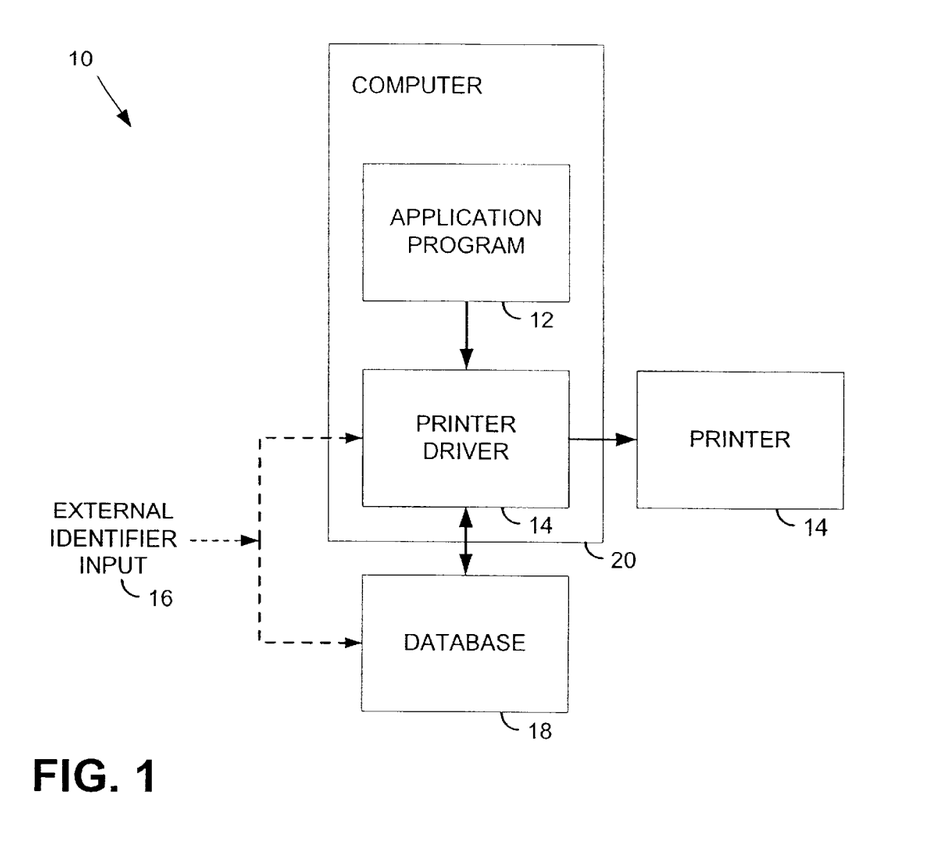
FIG. 1 shows an embodiment of a document management system according to one embodiment of the present invention.

Turning to a particular example, consider the arrangement shown in FIG. 1. An application program 12, such as Microsoft Word or Excel, Adobe Photoshop, etc., sends print data to a software printer driver 14. A watermark data payload that is to be associated with the printed page is either generated internally by the printer driver, or received from an external input 16. In the depicted system this payload is a 32 bit identifier.

(The length of the payload depends on the application. In some cases, a single bit payload will suffice (e.g., it may serve as a flag to convey a single item of status information about a document—such as confidential, do-not-copy, draft, etc.) Or several such flags may be conveyed by a relatively short payload. Certain textual or numeric information may be literally encoded by the payload, such as the date and time the document was printed (e.g., a 24-bit number representing the number of elapsed minutes since Jan. 1, 2000). The foregoing are examples of direct data encoding. Indirect data encoding, such as the 32 bit identifier cited above, uses the payload as an index into another data repository in which large collections of data can be stored. This collection (sometimes called a "record") may include meta-data associated with the document, such as date, author, size, keywords, file name and storage address, footnotes or other annotations, checksum, etc. In one particular embodiment, identifiers are issued sequentially, with each document thereby assigned a unique identifier.)

By reference to the payload data, the printer driver modifies the print instructions sent to the printer so as to introduce the subtle markings associated with the corresponding steganographic watermark. In some regions of the printed page this entails depositing more ink (or toner); in other regions in may entail depositing less ink. Subtle color variations can also be introduced to effect the encoding.

If the printer driver generates the identifier data itself—rather than receiving the identifier externally—then the identifier will typically need to be stored in a database 18 (or other data structure). Accordingly, the FIG. 1 arrangement shows the printer driver providing the identifier to the database. This database may be stored at a user computer 20, at a remote computer, or may be distributed in some fashion. (If the database 18 is remote from the user computer 20, it would be prudent to encrypt the data transmitted to the database as a security precaution.) Management of the database may be through a dedicated database program (e.g., Microsoft Access), or it can be a simple table data structure or the like maintained by the printer driver itself. (If the identifier data is received externally, this data may be written to the database by the same program that generated or provided the identifier data to the printer driver.)

When, thereafter, the printed document is presented to an optical device, a software program decodes the payload from the steganographic watermark and initiates a corresponding action. If the payload represents status or textual information, the user can be advised of such information (e.g., by a corresponding screen display), or the sensing computer system can take some action based on the information (e.g., refusing to perform a reproduction operation). If the payload represents an identifier, the database 18 is queried for corresponding data, and this data is used in providing a user response. In the case earlier reviewed, the database record contains the file name and storage address of the electronic version of the printed file. The corresponding application program (e.g., Microsoft Word) is then invoked (if it is not already running), and the identified file is accessed from the specified address and opened. The document is thereby presented on the user's screen—ready for editing.

As with Internet hyperlinks, a problem can arise if a document has been moved from the address associated with that document in the database. One way of managing this is by a software program (which may be termed a daemon) that monitors movements of files within a computer's (or network's) file system, and updates any database records referring to such file locations. Another is for a software program to check all document addresses in the database, e.g., as a background process, to confirm that the referenced document is in the expected location. If a file is not found, the program can undertake an automated search for the file in other locations (e.g., checking file identity by checksum data or the like), and automatically updating database references as appropriate. If files that haven't been accessed for a prolonged period are periodically archived in compressed form on online archival storage, the software program may review recent entries to the archive list and identify the archived location of certain moved files in this fashion. Or the program can simply report missing files to the user so that the user can manually identify a new file location to the database. If a missing file cannot be located, the date of its disappearance can be written into the database record so that, if the document is later needed, the date might be available to help investigate the document's disappearance. Yet another approach that obviates the problem of moved files is to make an archival copy of each file, at the time of printing, in database 18.

In certain applications involving confidential or otherwise secure documents, access to some or all of the stored data may be restricted. In such case, access may be denied unless the user demonstrates suitable authority, e.g., by a password (which may have been earlier entered, such as a network or login password), or by providing some other security token. The token may take the form of biometric identity data, such as voice-print, fingerprint, retinal scan, etc., or may take another form.

In some embodiments, showing the printed document to the optical sensor may cause the computer to present a variety of information, including menu options, to the user. One of the menu options may be to recall the electronic version of the document for editing, as just-described. Other menu options may permit review, or action, based on the associated meta-data.

Figure 2:
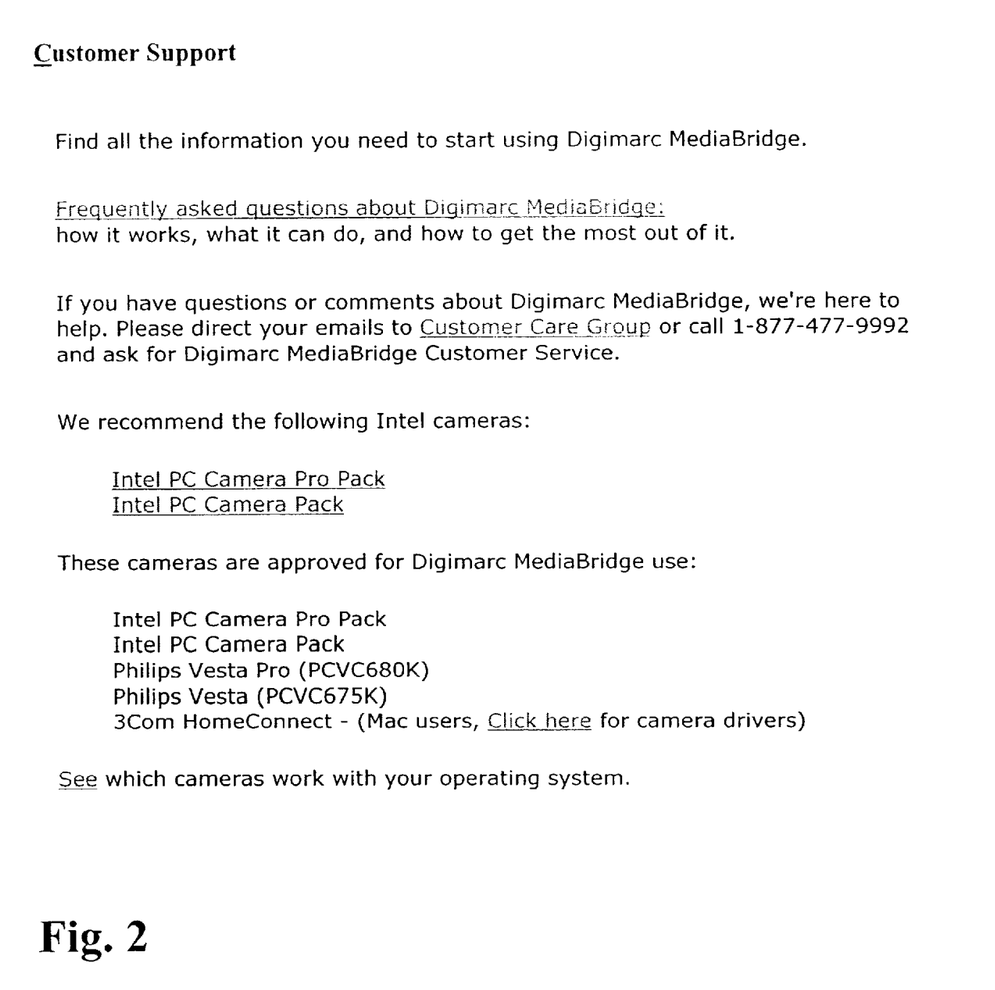
FIG. 2 shows a printed document in which embedded hyperlinks are underlined.

Increasingly, printed documents include reference to on-line resources—most commonly Internet web pages but sometimes PDF documents, audio or video clips, multimedia presentations, locally-stored files, etc. Microsoft Word and other programs include provision for associating links with text. In Word, this is done by highlighting an excerpt of text, selecting Hyperlink from the Insert menu, and then specifying the path (electronic address) and file (object name) to be associated with that text. Word responds by changing the appearance of the text (e.g., by underlining, and changing color), and embedding the specified link in the electronic version of the document. Such a document is shown in FIG. 2.

When the document is printed, such links can be sensed and stored in a database record associated with that document, and thereafter shown to the user when the printed document is presented to an optical input device.

In one such embodiment, the printer driver monitors print data, looking for text having formatting that is characteristic of an embedded link (e.g., blue text, underlined). Additionally, the printer driver can look for text conforming to standardized addressing protocols (e.g., text beginning with "http:// . . . " or "ftp:// . . . " or "www. . . . ") When such text is found, the printer driver can store the corresponding link in the database 18 in association with an identifier for that document.

Figure 3:
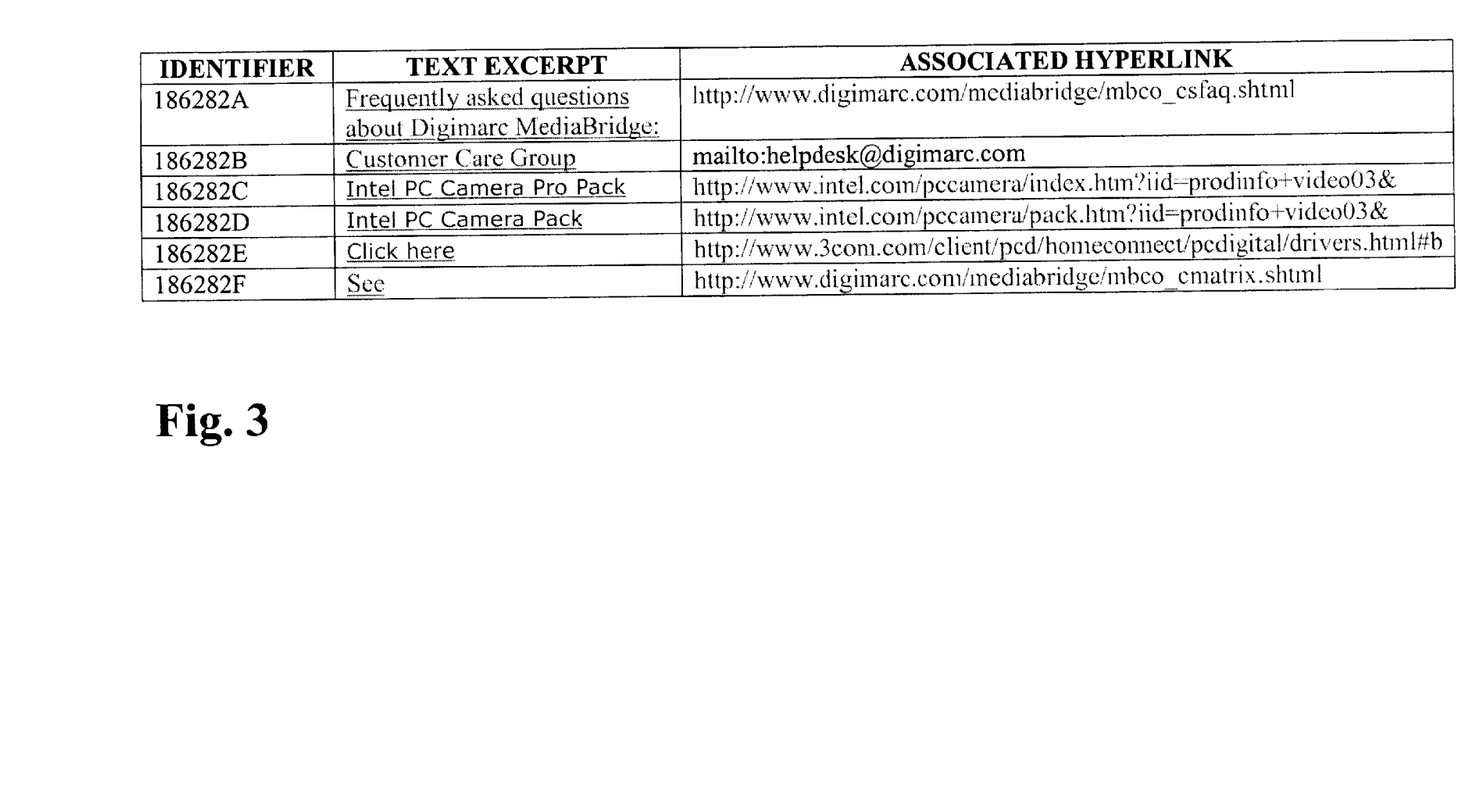
FIG. 3 shows portions of a database record associated with the FIG. 2 document.

In the case of an explicit address (e.g., "http:// . . . "), the address text itself is copied into the database. In the case of characteristically-formatted text (signifying an embedded link), the printer driver can query the application program that sent the output for printing, to determine the link address associated with each such excerpt of text. These links are stored in the database, together with the text excerpts to which they correspond. (Again, the printer driver inserts at least one steganographic watermark in the printed output—serving to identify the document.) Database excerpts corresponding to the FIG. 2 document, are shown in FIG. 3. (In this example, the document identifier is 186282.)

As in the embodiment detailed earlier, when this printed page is later shown to an optical sensor, decoder software reads a document identifier from the watermark payload and uses the identifier to access one or more database records corresponding to the document. If the record(s) includes one or more links, these can be displayed on the computer screen—available for the user to click and follow. By such arrangement, associated on-line resources are made readily available when reviewing paper documents.

The printer driver's monitoring needn't be limited to on-line resource references. The print data can be monitored for various other types of information, and these other items of information can be stored in the database. One example is document titles, or headings. These can be identified in the printed output by formatting, e.g., set apart from surrounding text by font size, print attribute (bold, underlined, italics), style, or set-apart on a line to themselves—not ending in a period, etc. If such information is captured at print time and stored in the database 18 in association with the document identifier, the database can serve as an index of sorts to the document contents. The database can later be searched for words or phrases of interest, and documents matching the query can thereby be identified. In some cases, every word in a document (except common noise words) can be logged in a corresponding database record, thereby generating—in real time—an index or table of contents to all documents printed by a given printer or printer driver.

In some applications, the watermark with which the printed document is encoded may be fragile. That is, the watermark may be designed (e.g., by low strength) not to survive expected corruption mechanisms (e.g., the scanning and printing associated with photocopying, compression and decompression associated with JPEG electronic document storage, etc.). If such a mark is not found in a later-encountered document, then the document can be inferred to be a reproduction rather than the original.

Such a frail watermark can be in addition to a robust watermark—one designed to withstand expected corruption mechanisms. Only if both watermarks are detected in scan data from an object is the object inferred to be an original. Equipment processing the scanned document data can respond differently depending on whether the document is inferred to be an original or a copy, e.g., permitting or disabling certain operations.

In some embodiments it may be desirable for the user to identify himself or herself to the system—preferably in a non-repudiable way (e.g., password or other security token)—when the document is serialized or otherwise assigned an identifier. The database 18 can then log this person's identity in association with that print-out, in case this fact later becomes an issue. Relatedly, it may be desirable for the person who printed the document to specify the intended recipient(s). This data, too, can be stored in the database in association with the identifier that is watermarked in the printed document. If both measures are employed, then when a document is presented to a camera, the responding system can identify both the user who printed the document, and the intended recipient.

Relatedly, digital signature technology can be employed in conjunction with printed documents. As is familiar to those skilled in the art, digital signatures generally involve applying a hash function or the like to a document file, yielding a signature that is stored for later use. If the document file is thereafter changed, even by a single bit, it will no longer yield the same hashed output, or digital signature.

In the present context, the digital signature generated from an electronic document can be encoded in a printed document as the payload of an embedded watermark, or can be included in a database record identified by the watermark. If the printed document is thereafter shown to a camera, and an electronic version of the document is retrieved from storage, the signature of the retrieved file can be checked against the signature as represented in the watermark or as stored in the database record. If the signatures don't match, the electronic version of the document is known to have been altered.

Checksums derived from the electronic version of a document can be used in similar fashion to digital signatures.

Still another option is to encrypt an electronic version of a file, and encode an encoding key in a watermark in the printed document (or in a database record identified by the watermark). The person who encrypted the document knows the key and can open the electronic file. But third parties cannot open the electronic version of the document, unless they have custody of a printed version of the document. (This is an application where a fragile watermark would be beneficial, so that custody of a photocopy would not be sufficient to gain access to the electronic file.)

Similarly, printed documents may convey (or may point to database records containing) encryption keys permitting electronic access to unrelated documents.

It will be recognized that public key encryption, as well as private key encryption, can be used in certain of the foregoing contexts.

Techniques like those reviewed above in connection with office document can be applied to other objects as well. A "document" can thus be any object with printing, such as packaging.

Consider a catalog for a data storage medium, such as a diskette, disk, tape, CD, or DVD. Files can be copied onto the medium, and an electronic directory listing can be generated (e.g., by using the DIR function of DOS, or the counterpart functions provided in Microsoft Windows and other operating systems). If desired, the directory listing can be annotated by a user, e.g., by adding descriptive information.

This listing is stored in a data structure (e.g., a table, database, etc.) in association with index data. This index data is encoded in a watermark or other machine-readable indicia and printed on a label that is applied to the medium. (Additional data can also be printed on the label in human-intelligible form, such a text giving the date the diskette was labeled, the proprietor of the disk, a descriptive name or summary of disk contents, etc.)

By holding such a labeled disk to a webcam, video camera, optical mouse, or other optical input device, a listing of the disk's contents can rapidly be displayed. (As is now familiar, the optical input device provides image data corresponding to the label to a watermark detector. The watermark payload that is output from the watermark detector is used to index the data structure, permitting access to the corresponding directory listing. This listing is then presented on the computer screen for display.)

The user may be invited to specify certain search parameters, such as author, file date, file name, etc. Only files in the directory listing meeting the specified criteria can then be displayed. If a particular file name is specified, the user can hold diskettes up to the webcam in rapid succession, permitting dozens of diskettes to be surveyed in a minute or so, looking for the desired diskette.

The display presented to the user may include content listings of a collection of disks—not just the disk presented to the webcam. For example, presentation of a 3¼ inch diskette to the webcam may prompt a listing of all 3¼ inch diskette contents contained in the data structure, or all such disks labeled on the same date as the diskette presented by the user to the webcam (in both cases, with the contents of the user-presented diskette listed first). If the file sought is not cataloged as being on the first-listed diskette list, a Search or Find function can be executed on the listing to identify another diskette on which a desired file is stored. (The identification of like-media can be effected by selecting index identifiers from different ranges for different media. Thus 3¼ inch diskettes may have identifiers in one range, CDs may have identifiers in another, etc.)

The data structure may be posted to a shared resource on a network, so that this functionality can be effected on an enterprise-wide basis, encompassing large collections of files stored on diverse media.

The arrangement just detailed can be adapted for use in other contexts, to provide electronic listing of data associated with diverse physical objects.

From the foregoing, it will be recognized that embodiments according to the present invention permit data about an object to be accessed simply by showing the object to a webcam or the like.

Having described and illustrated the principles of the invention with reference to illustrative embodiments, it should be recognized that the invention is not so limited.

For example, while the detailed embodiments were described as employing steganographic digital watermarks, the same principles can likewise be utilized in conjunction with other marking techniques, including 1D and 2D bar codes, data glyphs, OCR, magnetic ink, etc.

Essentially any digital watermarking technology can be used in the described embodiments. One particular technology is detailed in the present assignee's patent application Ser. No. 09/503,881, filed Feb. 14, 2000, and in other references cited herein. Those skilled in the watermarking art are familiar with a great number of particular watermarking techniques.

In some cases, printing is not required to effect a digital watermark. For example, the watermarking can be effected by texturing, e.g., as disclosed in the present assignee's U.S. Pat. No. 5,822,436.

While the invention was particularly described with reference to an implementation involving a Windows printer driver, other forms of implementation are possible. Consider, for example, Adobe Postscript—a popular page description language implemented in many office printers. Watermarking may be included as an intrinsic feature of a Postscript printer engine (or any page description lanaguage). As part of printing a document, any embedded links could be registered in a suitable database 18, and the printing commands could be modified to include the appropriate ID with the setup for each page. Addition of a tint to effect watermarking could be provided when the document is converted by the engine from text to ink/toner/dye. A further advantage here is that the printer itself could have certain meta-data associated with it that is conveyed in the watermark or stored in a database record to which the watermark points (e.g., data specifying that the document was printed on a HP LaserJet 8000, with a network name of "XYZ," having port address of \\Cobra\LGL-HP8000, from a print job originated by user BCONWELL, etc., etc.). And the embedding process may be tuned by the vendor implementing the Postscript engine on their platform for optimal performance.

The illustration of the invention in the context of office documents and diskettes should not be taken as limiting its utility. To name but one other application, blueprints and other construction drawings can be encoded with a watermark. Again, the watermark can directly encode meta data, or can point to a data structure where such further information is stored.

One of many applications of such information is to ensure that a contractor is working from the latest revision of a drawing. A camera-equipped cell phone, or wireless palmtop computer with imaging capability, can be used by the contractor to acquire image data from the drawing, decode the embedded watermark ID, query a remote database for the latest revision number of that drawing, and present the latest revision number to the contractor. The contractor can check the number thus-obtained with the revision number printed in the title block of the drawing. If they match, the contractor is assured that the drawing depicts the latest information. (Blueprints and construction diagrams are forgiving media—the watermark needn't be invisible. The strength of the watermark can thus be increased to the point that a pebbling or grainy effect appears on the background of a drawing without reducing the drawing's functionality for its intended use.)

While the invention was described with reference to certain functionality implemented in software, this is not essential. Hardware, of a combination of hardware and software can be used in other embodiments. Likewise, the form of optical detector is not crucial. 2D sensor arrays, such as CCD and CMOS cameras (still or video) can be employed. So, too, can ID sensor arrays, such as are conventionally found in scanners. Single photosensor systems, such as laser diodes with photodiodes can also be used.

The foregoing techniques can be employed in conjunction with teachings of various of the present assignee's co-pending applications, including Ser. No. 09/074,034 (filed May 6, 1998), Ser. No. 09/127,502 (filed Jul. 31, 1998), Ser. No. 09/185,380 (filed Nov. 3, 1998), and the parent application cited above. For example, the '034 and '502 applications disclose arrangements for watermarking blank paper stock, the principles of which can be employed to mark printed output.

To provide a comprehensive disclosure without unduly lengthening this specification, applicants incorporate by reference the patents and applications cited above.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method of printing a document using print data output from an application program, comprising:

monitoring the print data for text associated with a hyperlink;

storing information about said hyperlink in a data structure, in association with a document identifier; and printing the document with an optically-detectable indicia thereon, said indicia being machine-readable, but not generally intelligible to human viewers thereof, said indicia representing a plural-symbol payload including said document identifier.

2. A printed document produced according to the method of claim 1.

3. The method of claim 1 wherein the indicia comprises a steganographic watermark.

4. The method of claim 1, further comprising optically scanning the printed document to provide scan data; decoding the scan data to produce binary data corresponding to said indicia, and accessing the stored information using at least a portion of said binary data.

5. A method of obtaining an electronically actuable hyperlink with a printed document produced according to claim 1 comprising:
presenting the printed document to an optical input device; and
presenting to a user one or more electronically actuable hyperlinks included in said printed document.

6. The method of claim 5, wherein said optical input device provides scan data, said method further comprising the steps of decoding the scan data to produce binary data corresponding to said indicia, and accessing the stored information using at least a portion of said binary data to obtain the one or more electronically actuable hyperlinks.

7. A method comprising:
presenting a printed document to an optical input device; and
presenting to a user one or more electronically actuable hyperlinks included in said printed document.

8. The method of claim 7, wherein in the optical input device communicates with a computerized processing module, wherein the computerized Processing module analyzes scan data generated by the optical input device for a machine-readable steganographic code carried by the document, and wherein the steganographic code is associated with the one or more electronically actuable hyperlinks.

9. A method of producing a printed document from document data provided by an application program, the method including using a printer to apply ink or toner to a substrate, the method being characterized by adding data corresponding to an optically-detectable indicia in print data corresponding to said document data, said indicia being machine-readable, but not generally intelligible to human viewers thereof, said indicia encoding plural bits of data.

10. The method of claim 9 in which said adding is performed by printer driver software.

11. The method of claim 10 in which a print dialog interface associated with said printer driver software gives a user thereof an option to elect formation of said indicia on the printed document, or not.

12. The method of claim 9 in which said adding is performed by hardware or software resident in the printer.

13. The method of claim 9 wherein the indicia comprises a steganographic digital watermark.

14. The method of claim 9 wherein said digital data includes an identifier corresponding to a database record, the method further including storing data relating to the printed document in said database record.

15. The method of claim 14 that includes transmitting said data for storage in the database record in encrypted form.

16. The method of claim 14 wherein said digital data encodes metadata relating to the document.

17. A printed document produced according to the method of claim 12.

18. The method of claim 9, wherein the plural bits of data correspond to one or more electronically actuable hyperlinks.

19. The method of claim 18, wherein the machine readable indicia comprises an identifier which is used to access the information corresponding to the one or more electronically actuable hyperlinks included in the printed object.

20. The method of claim 19, wherein the steganographic indicia comprises a digital watermark.

21. The method of claim 20, wherein the information is provided through a computer system display.

22. A method comprising:
receiving optical scan data from an optical input device, wherein the optical scan data corresponds to a printed object including machine-readable steganographic indicia provided thereon and the printed object includes one or more electronically actuable hyperlinks, the machine-readable steganographic indicia conveying information corresponding to the one or more electronically actuable hyperlinks;
analyzing the optical scan data to recover the machine-readable steganographic indicia; and
providing information corresponding to the one or more electronically actuable hyperlinks included in the printed object.

23. The method of claim 22, wherein the machine readable indicia comprises the information corresponding to the one or more electronically actuable hyperlinks included in the printed object.

24. A computer system to produce a printed document from document data provided by a software application program, the software application program cooperating with the computer system, wherein the computer system includes a processor, memory and software stored in the memory for execution by the processor, the software including instructions to present a print dialog box in response to user control, wherein the print dialog box includes a graphical user interface permitting the user to select a steganographic encoding option for the printed output, and wherein the steganographic encoding conveys at least creation information.

25. The system of claim 24, wherein the creation information comprises a creation date.

26. The system of claim 24, wherein the creation information comprises author information.

27. The system of claim 24, further comprising a communications port to communicate with a printer, wherein the creation information comprises information regarding the printer.

28. A method of accessing a resource comprising:
receiving data corresponding to a printed object, the printed object including both text and background, at least the background having information indicative of least one of a network address and a file storage address associated with the resource steganographically embedded therein;
decoding the information from the data; and
accessing the resource using the information.

29. A method of accessing a resource comprising steps of:
receiving data from an application program, the data corresponding to an object to be printed, the data including text and background;
steganographically embedding into a region of the background having substantially non-uniform pixel values certain information indicative of at least one of a network address and a file storage address associated with the resource; and
printing the object using the data into which said information has been steganographically embedded.

* * * * *